US012674474B1

(12) United States Patent
Suitter

(10) Patent No.: US 12,674,474 B1

(45) Date of Patent: Jul. 7, 2026

(54) SYSTEM AND METHOD FOR A PILOT SHIFTED REGENERATION VALVE

(71) Applicant: Custom Truck One Source, Inc., Kansas City, MO (US)

(72) Inventor: Coltyn Tate Suitter, Liberty, MO (US)

(73) Assignee: Custom Truck One Source, Inc., Kansas City, MO (US)

( * ) Notice: Subject to any disclaimer, the term of this patent is extended or adjusted under 35 U.S.C. 154(b) by 0 days.

(21) Appl. No.: 19/264,264

(22) Filed: Jul. 9, 2025

(51) Int. Cl.
*F15B 11/02* (2006.01)
*F15B 11/024* (2006.01)

(52) U.S. Cl.
CPC ..... *F15B 11/024* (2013.01); *F15B 2211/3058* (2013.01); *F15B 2211/329* (2013.01); *F15B 2211/426* (2013.01); *F15B 2211/428* (2013.01); *F15B 2211/7053* (2013.01)

(58) Field of Classification Search
CPC ............ F15B 11/024; F15B 2211/3058; F15B 2211/3127; E02F 9/2203
See application file for complete search history.

(56) References Cited

U.S. PATENT DOCUMENTS

| | | | | |
|---|---|---|---|---|
| 9,003,951 | B2 * | 4/2015 | Sefcik | F15B 15/149 92/51 |
| 9,593,467 | B2 | 3/2017 | Kajita et al. | |
| 10,337,538 | B2 | 7/2019 | Matsuzaki et al. | |
| 10,436,229 | B2 * | 10/2019 | Hijikata | E02F 9/2232 |
| 10,787,790 | B2 | 9/2020 | Imura et al. | |
| 10,844,885 | B2 | 11/2020 | Balboni et al. | |
| 11,149,753 | B2 * | 10/2021 | Takahashi | F15B 19/005 |
| 2013/0283777 | A1 * | 10/2013 | Wen | F15B 11/024 60/477 |
| 2023/0235755 | A1 | 7/2023 | Nose et al. | |

FOREIGN PATENT DOCUMENTS

| | | |
|---|---|---|
| EP | 2005006 B1 | 9/2010 |
| JP | 2012107687 A | 6/2012 |
| JP | 2016176567 A | 10/2016 |

OTHER PUBLICATIONS

Power & Motion, Book 2, Chapter 17: Regeneration Circuits, dated Jan. 14, 2010; https://www.powermotiontech.com/technologies/article/21884332/book-2-chapter-17-regeneration-circuits.

Jalayeri et al, A Throttle-Less Single-Rod Hydraulic Cylinder Positioning System: Design and Experimental Evaluation, Advances in Mechanical Engineering, dated May 1, 2015, https://researchgate.net//publication/277918213_a_throttle-less_single-rod_hydraulic-cylinder_positioning_system_Design_and_experimental_evaluation.

* cited by examiner

*Primary Examiner* — Abiy Teka

(74) *Attorney, Agent, or Firm* — Lathrop GPM LLP; Robert J. Lambrechts

(57) ABSTRACT

A system and method for recycling fluid from a first side of a double acting hydraulic cylinder for use on a second side of the cylinder to accelerate piston movement that minimizes pressure fluctuations in large cylinders. The disclosed method and system provide for smooth operation, reducing the risk of sudden shocks or spikes that could damage components including valves and cylinders. This stability also helps maintain consistent flow rates, ensuring predictable performance, particularly in applications requiring precise control, such as in cylinder movements.

17 Claims, 9 Drawing Sheets

SYSTEM AND METHOD FOR A PILOT SHIFTED REGENERATION VALVE

TECHNICAL FIELD

A hydraulic system pilot shifted regeneration valve for use in accelerating the movement of the piston in a hydraulic cylinder that avoids uncontrolled release of hydraulic potential energy.

BACKGROUND

In a typical hydraulic system, a pump provides fluid flow to hydraulic cylinders that perform mechanical work. There remains a continuous need for boosting efficiency, speed, and productivity in equipment that uses hydraulic cylinders such as earthmoving equipment, boom cranes, and other heavy equipment especially during low-load, high-speed operations—while also contributing to energy conservation and component longevity.

During certain operations, however, excess fluid that would normally be directed to a tank or reservoir can instead be rerouted to improve the cylinder's motion. This process is known as "regeneration," where fluid from one side of the cylinder is recycled and sent to the other side to accelerate cylinder movement without the need for additional fluid from the pump. A pilot-shifted regeneration valve controls this flow shifting between normal and regenerative extension.

A pilot-shifted hydraulic regeneration valve as disclosed herein is an advanced version of a standard regeneration valve, as it is equipped with a pilot mechanism that allows for automated control based on system pressure. A pilot valve is a smaller valve that controls a larger main valve. In the case of pilot-shifted regeneration valves, the pilot is designed to "shift" the main valve, activating regeneration only when needed and deactivating it when conventional flow is more efficient or required by system conditions. This controlled shifting between regenerative and non-regenerative modes allows for highly responsive and adaptable operation.

The pilot-shifted valve regeneration valve as disclosed herein operates based on a pressure signal from a directional valve. When the pilot pressure reaches a predefined level, the pilot valve shifts, causing the oil to be redirected to the regenerative path. For example, in a double-acting cylinder, fluid from the retraction side can be redirected to the extension side, reducing the demand for pump flow and achieving faster extension. Once the required movement is complete or if the load conditions change, the pilot control shifts the valve back to a standard operating mode, ending the regeneration process.

A pilot-shifted hydraulic regeneration valve as disclosed herein offers several key advantages. First, they enable faster cylinder movement without additional pump capacity, which can significantly reduce energy consumption. By reducing the demand on the pump, these valves also minimize system heat generation, leading to improved efficiency and an extended service life for hydraulic components. In applications requiring frequent and rapid cylinder movement—such as material handling, construction machinery, and industrial automation—this can result in considerable operational cost savings.

Additionally, pilot-shifted valves provide more precise control over the regenerative process. Since the regeneration path is activated based on pilot pressure rather than simple flow conditions, the valve can adapt to changes in load or motion requirements. This adaptability makes these valves suitable for complex or variable-load applications, where different motion profiles are required at different times.

Pilot-shifted hydraulic regeneration valves are especially beneficial in systems with high-frequency or high-speed actuation needs. While these valves are widely used in machines with hydraulic piston actuation such as excavators, and agricultural equipment, where enhanced speed and energy efficiency are highly valued. Engineers must carefully design these systems, as regeneration increases piston extension velocity, potentially leading to system instability if not well-managed.

To visualize a pilot-shifted hydraulic regeneration valve, it is important to understand the structure and hydraulic fluid flow path of a typical valve. This type of valve contains a main valve body, a primary pathway connecting the pump and tank, two ports for the cylinder connections to include one for the extension and retraction sides of the hydraulic cylinder.

The regeneration pathway is a flow path that allows fluid from the retraction side of the cylinder to be redirected to the extension side of the cylinder rather than returning directly to the tank, creating a regenerative flow. The pilot valve is often a smaller valve that is positioned near the main valve and controls the shifting of the main valve. A pressure line connects the pilot valve to the hydraulic circuit, when the pressure reaches a specified level regenerative flow is activated. The pilot valve shifts between regenerative and non-regenerative modes based on signals from the main valve. Fluid from the pump can go directly to either the extension or retraction side of the cylinder, depending on the position of the main valve. When regeneration is active (initiated by a switch), the fluid from the retraction side of the cylinder is rerouted to the extension side of the cylinder.

The disclosed pilot-shifted hydraulic regeneration valve represent an important advancement in hydraulic system technology, offering a balance between performance enhancement and energy savings. By employing these valves, industries can improve system efficiency, reduce operational costs as well as energy requirements, and maintain precise control over hydraulic operations, making them a critical component in modern hydraulic systems. However, a not fully resolved concern with constant regenerative valves has to do with lunging of the piston within the hydraulic cylinder under various load scenarios. The pilot-shifted regeneration valve system and method disclosed herein addresses that critical deficiency.

SUMMARY

A hydraulic system that controls cylinders consists of several basic components that work together to generate, control, and transmit hydraulic power to move the cylinders. These key elements include fluid (typically hydraulic fluid) which is the medium through which energy is transferred in the hydraulic system. The fluid acts to transmit power, lubricate the system, and prevent corrosion. Next is the pump which converts mechanical energy (usually from an electric motor or engine) into hydraulic energy by pressurizing the hydraulic fluid. It draws fluid from the reservoir and pushes it into the system under pressure. Third is a reservoir which holds the hydraulic fluid, providing a storage area and allowing for cooling, separation of air and contaminants, and ensuring an adequate supply of fluid for the system.

Fourth are control valves that regulate the flow and pressure of the hydraulic fluid to the cylinders. These can be manually, hydraulically, or electronically controlled. The valves direct the flow to the appropriate side of the cylinder to extend or retract it, depending on the desired movement. Fifth are hydraulic cylinders which are the primary component that converts hydraulic energy into mechanical motion. It consists of a piston inside a cylinder barrel, which moves in and out when fluid is directed into the chamber, creating linear motion. Sixth are hydraulic lines (hoses and pipes) that are used to carry the pressurized fluid from one component to another. They are typically flexible hoses or rigid pipes that connect the pump, reservoir, valves, and cylinders. Seventh are pressure relief valves that prevents excessive pressure buildup in the system, protecting the components from damage.

If the pressure exceeds a certain limit, the valve opens to release some fluid, maintaining safe operating conditions. These components work in conjunction with each other to control the motion of hydraulic cylinders, whether it is lifting, pushing, pulling, or other types of linear movement, all while maintaining proper pressure, flow, and system safety.

The system and method disclosed herein seek to address the undesirable hydraulic piston lunges that can occur with a regeneration circuit. These lunges refer to sudden, unexpected movements of the hydraulic piston extending from the cylinder which can be caused by uncontrolled shifts in fluid dynamics. The regeneration function speeds up the extend stroke by using fluid from the retract side. If the system is not properly balanced (in terms of load, pressure, or control), this can cause an imbalance between the hydraulic forces acting on the piston.

The regeneration circuit involves valves that control the direction of flow. If these valves malfunction or are not properly tuned, this can cause pressure spikes or stalls in the system, resulting in sudden and undesirable movements.

An object of the pilot shifted regenerative hydraulic system disclosed herein is that it avoids pressure perturbations and improves system stability and efficiency.

A further object of the pilot shifted regenerative hydraulic system disclosed herein is that by minimizing pressure fluctuations, the system ensures smooth operation, reducing the risk of sudden movements that could damage components, such as valves or cylinders and result in injuries of those near the cylinders.

A further object of the pilot shifted regenerative hydraulic system as disclosed herein is that it helps maintain consistent flow rates, ensuring predictable performance, particularly in applications requiring precise control, such as in large cylinder movements.

A further object of the pilot shifted regenerative hydraulic system as disclosed herein is that it avoids flow disruptions and prevents energy losses associated with pressure surges, enhancing the overall efficiency of the system.

A further object of the pilot shifted regenerative hydraulic system as disclosed herein is that it transitions more smoothly between regenerative and non-regenerative modes, optimizing energy use while minimizing the potential for damage or downtime.

Various objects, features, aspects, and advantages of the disclosed subject matter will become more apparent from the following detailed description of preferred embodiments, along with the accompanying drawings in which like numerals represent like components. The contents of this summary section are provided only as a simplified introduction to the disclosure and are not intended to be used to limit the scope of the appended claims.

DETAILED DESCRIPTION

Figure 1:
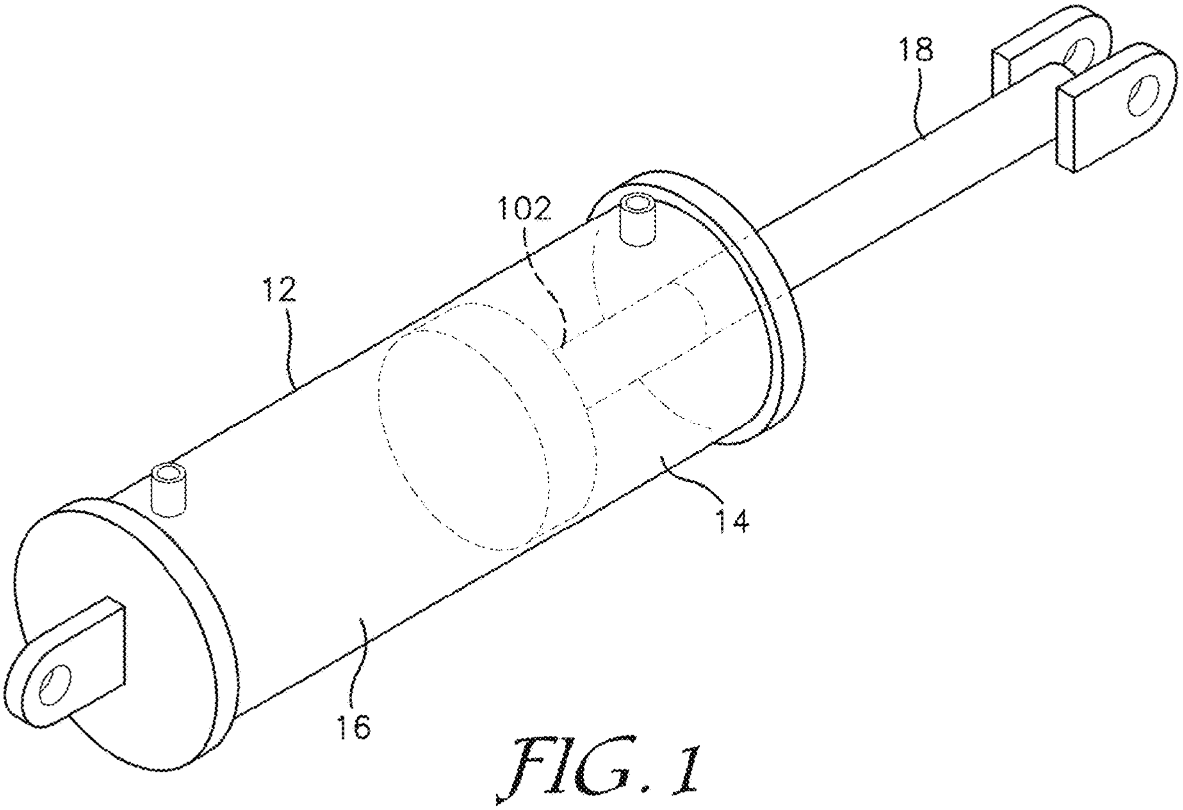
FIG. 1 illustrates an embodiment of a double acting hydraulic cylinder.

The following description is merely exemplary in nature and does not limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings.

The drawings furnished are intended to illustrate and plainly disclose presently envisioned embodiments to one of skill in the art but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the order discussed or illustrated, unless specifically identified as an order of performance. It is also to be understood that additional or alternative steps can be employed.

When an element, object, device, module, apparatus, component, region or section, etc., is referred to as being "on", "engaged to or with", "connected to or with", or "coupled to or with" another element, object, device, module, apparatus, component, region or section, etc., it can be directly on, engaged, connected or coupled to or with the other element, object, device, module, apparatus, component, region or section, etc., or intervening elements, objects, devices, modules, apparatuses, components, regions or sections, etc., can be present.

In contrast, when an element, object, device, module, apparatus, component, region or section, etc., is referred to as being "directly on", "directly engaged to", "directly connected to", or "directly coupled to" another element, object, device, module, apparatus, component, region or section, etc., there may be no intervening elements, objects, devices, modules, apparatuses, components, regions or sections, etc., present. Other words used to describe the relationship between elements, objects, devices, modules, apparatuses, components, regions, or sections, etc., should be interpreted in a like fashion (e.g., "between" versus "directly between," "adjacent" versus "directly adjacent," etc.).

As used herein, the term "and/or" includes all combinations of one or more of the associated listed items. For example, A and/or B includes A alone, or B alone, or both A and B. Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Although the terms first, second, third, etc., can be used herein to describe various elements, objects, devices, modules, apparatuses, components, regions, or sections, etc., these elements, objects, devices, modules, apparatuses, components, regions, or sections, etc., should not be limited by these terms. These terms may be used only to distinguish one element, object, device, module, apparatus, component, region, or section, etc., from another element, object, device, module, apparatus, component, region, or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because varying and different embodiments may be made within the scope of the concept(s) taught herein, and because many modifications may be made in the embodiments described herein, it is to be understood that the details herein are to be interpreted as illustrative and non-limiting.

With a regeneration capacity, the system and method described herein aim to prevent unwanted hydraulic cylinder piston lunges. These lunges, which can be brought on by uncontrolled changes in fluid dynamics, are defined as abrupt, jerky movements of the hydraulic piston that extends from the cylinder. The regeneration function uses fluid from the retract side to accelerate the extend stroke.

Accurate flow regulation is essential to the regenerative function. A lunge could result from the cylinder extending too quickly or unpredictably if the flow rate or pressure is not properly controlled (due to incorrect settings or system circumstances). Particularly in systems with fluctuating loads or speeds, hydraulic systems with regeneration may be more responsive to operator input. The system as disclosed herein is configured to provide a regenerative functionality without the undesirable lunging and jerkiness of the hydraulic system that can lead to undesirable outcomes.

FIG. 1 illustrates a double acting hydraulic cylinder 12 that recycles fluid from a retraction side 14 of the cylinder 12 for use on an extension side 16 of the cylinder to accelerate piston 18 movement. The fluid in this instance is preferably a hydraulic fluid which is the medium by which power is transferred in hydraulic machinery.

Figure 2:
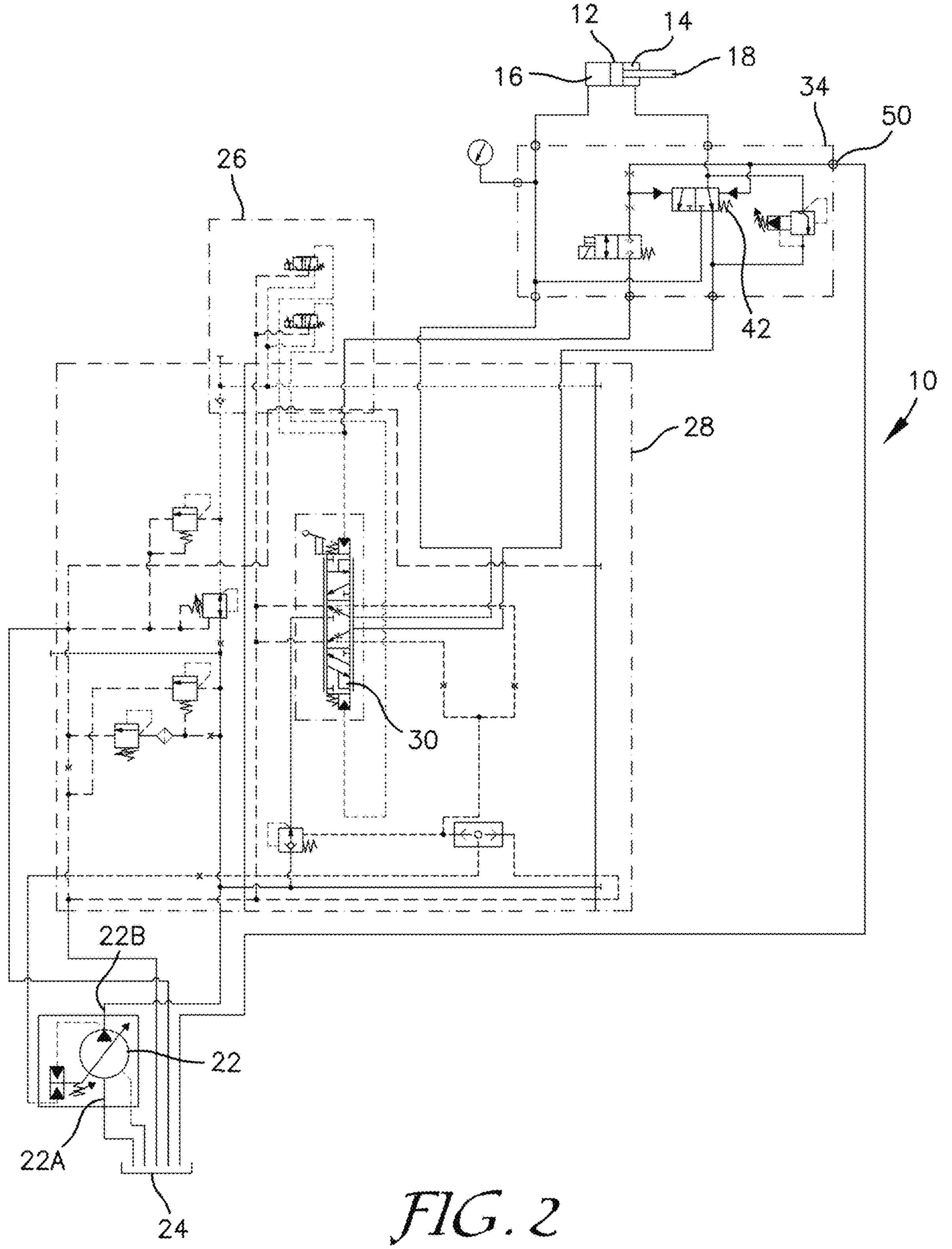
FIG. 2 illustrates a schematic of an embodiment of a hydraulic system to include a hydraulic pump, directional control valve, directional control valve spool, proportional pressure reducing control valve, and regeneration valve with double acting cylinder.

FIG. 2 is schematic of a full hydraulic system 10 to include a regeneration valve 34. The disclosed hydraulic system 10 utilizes a hydraulic pump 22 to deliver the flow of fluid. A hydraulic pump 22 is a mechanical device that converts mechanical power into fluid power and is used to create a vacuum at the inlet 22A, which pulls liquid from a reservoir 24 into the pump. These pumps deliver the fluid through the outlet 22B and into the hydraulic system 10.

FIG. 2 also discloses a proportional pressure reducing pilot control valve 26. A proportional pressure reducing pilot control valve 26 is used to control the flow of fluid by using an electric input signal. The electric current is converted into a magnetic field which interacts with the coiled wire in the proportional pressure reducing pilot control valve 26, which in turn changes the flow and pressure of the fluid. A proportional pressure reducing pilot control valve 26 is commonly used to control oil flow to a cylinder 12 or hydraulic motor. A proportional pressure reducing pilot control valve 26 provides infinite spool positioning and thus infinitely adjustable flow rates. The resulting flow or pressure output is proportional to the input change, i.e. triple the input produces triple the output.

The schematic at FIG. 2 further illustrates the utilization of a directional control valve 28. A directional control valve 28 is used to control the direction of fluid flow. The valve 28 regulates the flow of the pressurized fluid through the system to direct it where it is needed. This control of fluid flow enables the operation of hydraulic cylinders which drive machinery or tools. By opening and closing different flow paths, the directional control valve 28 directs the fluid to various parts of the system 10, controlling the movement of components like cylinders and motors. The directional control valve 28 disclosed herein has multiple ports and a movable spool 30 that controls the opening and closing of the ports. The spool 30 shifts between different positions, each of which connects the ports in specific ways, enabling fluid to flow to the appropriate cylinder or component in the system 10.

As mentioned immediately above, FIG. 2 discloses a directional control valve spool 30. The valve spool 30 within a directional control valve 28 is used to control the flow of fluid in various directions. The directional control valve spool 30 is a movable element within the body of the directional control valve 28 that regulates the path through which fluid flows, enabling the operation of cylinders or motors. The spool 30 controls the flow of fluid by shifting between different positions, each of which opens or blocks specific fluid paths. The movement of the spool 30 allows the directional control valve 28 to direct fluid to the correct port (input, output, or return), thereby controlling the movement of machinery or equipment.

The directional control valve spool 30 has multiple grooves or channels that align with ports in the directional control valve 28. As the directional control valve spool 30 moves, these grooves connect or disconnect the different ports, enabling fluid to flow in the desired direction. Directional control valves 28 with spools 30 are commonly found in configurations such as 2/2, 3/2, 4/2, or 4/3, depending on the number of ports and positions the spool has. In the disclosed system, the spool 30 of the directional control valve 28 moves between two positions, directing the fluid to various combinations of ports. The spool 30 can be actuated manually (e.g., with a lever), mechanically, electrically (with solenoids), hydraulically, or pneumatically, depending on the specific application.

The schematic of FIG. 2 additionally details a regeneration valve 34 for a double acting cylinder 12 which is a type of directional control valve used in hydraulic systems, typically with a double-acting cylinder 12. The primary function of the regeneration valve 34 is to enhance the efficiency of the cylinder's extension (or "outward" stroke) by utilizing the hydraulic fluid already in the system, thus reducing the amount of pump flow required. Regeneration involves using the fluid that is already in the system to 'regenerate' flow to extend the cylinder 12. When a double-acting hydraulic cylinder is used, there are two sides (ports) to the cylinder 12: one for extending the piston (outward stroke) and one for retracting it (inward stroke).

During the outward stroke of the double-acting cylinder 12, the regeneration valve 34 allows all the fluid from the retraction side 14 of the cylinder to be routed to the extension side 16. This makes the fluid supplied to the extension side 16 of the cylinder a combination of both the pump flow and the return fluid, reducing the time to fully extend the cylinder 12. This regeneration process helps reduce the size or number of pumps, saving energy and making the system more efficient. By using the existing fluid in the system, the extension of the piston 18 can occur more quickly with less input from the pump.

Without regeneration and during the extension stroke, the pump supplies fluid only to the extension side 16, and the retraction side 14 fluid returns to the reservoir 24. The same occurs for the inward stroke. With regeneration, the regeneration valve 34 re-routes some fluid from the retraction side 14 back into the extension side during the outward stroke. This reduces the amount of pump flow needed to extend the cylinder and allows the cylinder to extend more quickly and with less pump flow.

Figure 3:
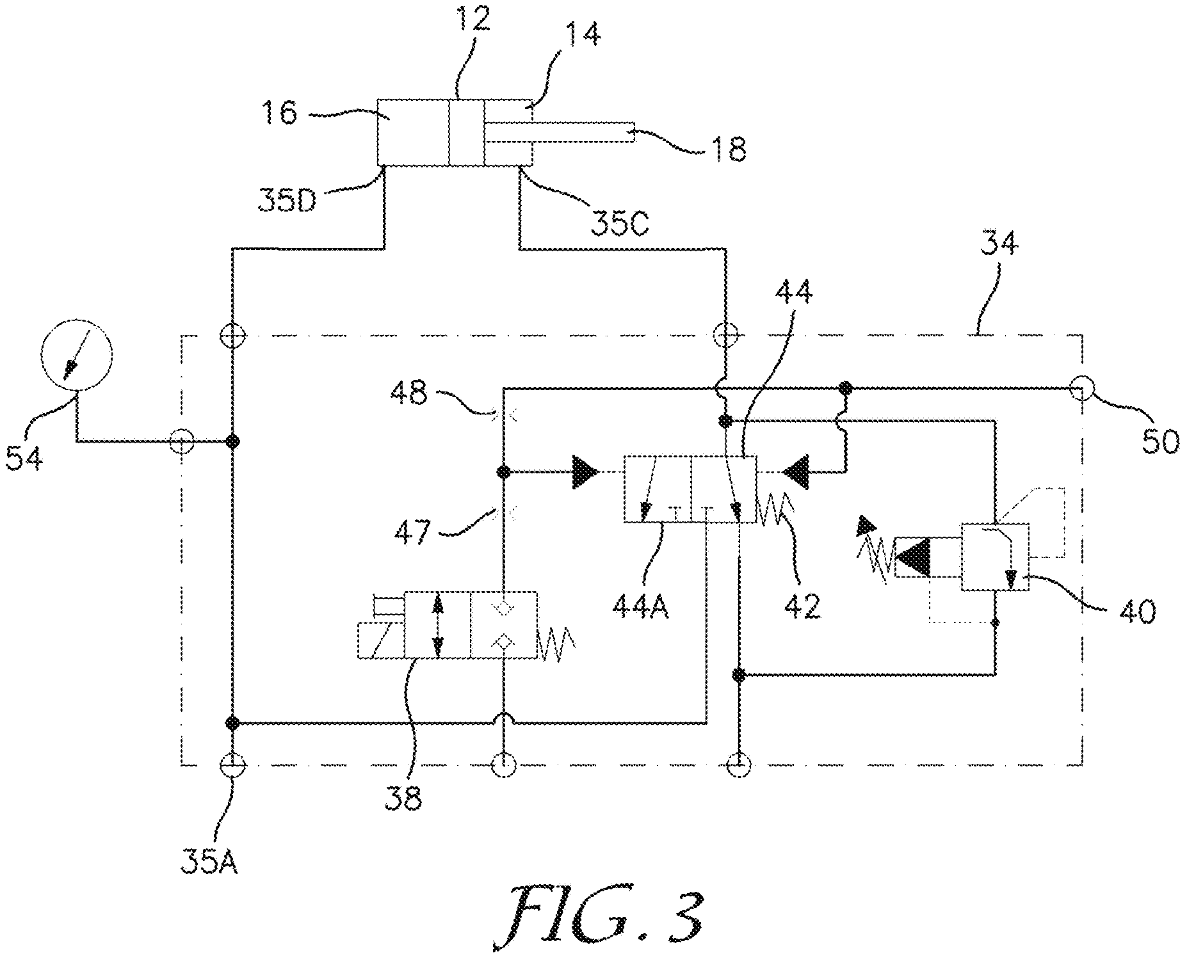
FIG. 3 illustrates a schematic of an embodiment of a pilot shifted regeneration valve assembly.

FIG. 3 reveals that the regeneration valve assembly 34 includes a port 35A for the extend (pump port), a drain port 50 for the return fluid, a port 35C which is connected to the retraction side 14 of the double acting cylinder 12, and a port 35D which is connected to the extension side 16 of the cylinder 12. By using the existing fluid in the system, the extension of the cylinder 12 can occur more quickly with less input from the pump 22. During the retraction stroke, the regeneration valve assembly 34 does not alter the flow path, and the hydraulic fluid flows as normal, meaning the pump 22 provides the necessary fluid for the retraction side 14 of the double acting hydraulic cylinder 12.

FIG. 3 is an enlarged schematic of the pilot shifted regeneration valve assembly 34 that includes a normally closed solenoid valve 38 to enable the regeneration function. A normally closed solenoid valve 38 is a type of valve that remains closed when it is not energized, preventing flow. When an electrical current passes through the solenoid coil, it creates a magnetic field that lifts the internal plunger, opening the normally closed solenoid valve 38 and allowing fluid to flow through.

The regeneration valve assembly 34 also includes a relief valve 40 for maintaining an operating pressure of the fluid on the retraction side of the cylinder 12 at or below a safe level. When the operator no longer wishes to rapidly extend the hydraulically actuated piston 18 using the pilot shifted regeneration valve assembly 34 the power supplied to the normally closed solenoid valve 38 is turned off. Once the power is turned off, the fluid under pilot pressure opposing the spring 42 in the piloted two position three-way valve 44 disposed within the regeneration valve assembly 34 is drained.

As illustrated at FIG. 3, the disclosed regeneration valve assembly 34 optionally includes a first (upstream) orifice 47 that is used to control how much flow enters the valve 34 and prevents pressure spikes or overshoot when the valve 34 shifts. The first orifice 47 is used to provide a decrease in hydraulic fluid pressure entering the two-position-three-way valve 44. The decreased pressure is used to overcome some or all the force of the spring 42 opposing translation of the spool (not shown) in the valve body 44A of the two-position-three-way valve 44 thereby determining the span of translation of the spool within the valve body 44A. The efficiency of this first orifice 47 to facilitate flow depends upon the orifice geometry and edge sharpness. The discharge coefficient preferably ranges from about 0.6 to about 0.9 in the disclosed hydraulic system.

The orifice geometry for the regeneration valve assembly 34 may be any of sharp edged, conical, rounded, beveled or chamfered edges or comprise long or short tubes and have a length to diameter ratio (L/D) of either less than one or greater than one. A preferred embodiment of the first orifice would be a sharp edge as this configuration results in predictable, repeatable pressure drops and is good for metering. Alternatively, a beveled or chamfered edge would provide slightly improved flow efficiency but also provide sufficient restriction.

The regeneration valve assembly 34 also includes a second orifice 48 to drain to a port 50 the pilot pressure opposing the spring in the piloted two position three-way valve 44. The drain port 50 allows the two-position three-way valve 44 to smoothly transition to position one resulting in a more forceful but slower movement of the piston 18. The second orifice 48 in the disclosed regeneration valve assembly 34 regulates the flow of pilot pressure fluid once the normally closed solenoid valve 38 is closed. The second orifice 48 regulates flow exiting the valve assembly 34 and is used to control actuator speed and maintain a certain pressure on the actuator side to smooth transitions or hold a position.

The second orifice 48 also influences how quickly the actuator retracts or the system depressurizes. As noted for the first orifice 47, the efficiency of the second orifice 48 to allow flow depends upon the geometry and edge sharpness of the orifice 48. The discharge coefficient preferably ranges from about 0.6 to about 0.9 in the disclosed hydraulic system. The size and design of the second orifice 48 directly influences how efficiently the transition out of regeneration occurs. The second orifice 48 regulates the pilot pressure delivered to the two-position three-way valve 44. The second orifice 48 ensures that the transition out of regeneration is smooth and predictable.

The disclosed system 10 also utilizes a pressure transducer 54 to determine if the pressure in the extension side of the hydraulic cylinder 12 is higher than the predetermined limit of the regenerative circuit. If the pressure transducer 54 senses that the fluid pressure is higher than the predetermined limit, the electrical controller will turn off power to the normally closed solenoid valve 38 to shift the two-position three-way valve 44 back to position one. This transition to position one allows the fluid from the retract side 14 of the cylinder 12 to return to the hydraulic reservoir 24 and the hydraulic piston 18 to extend with maximum force.

Figure 4:
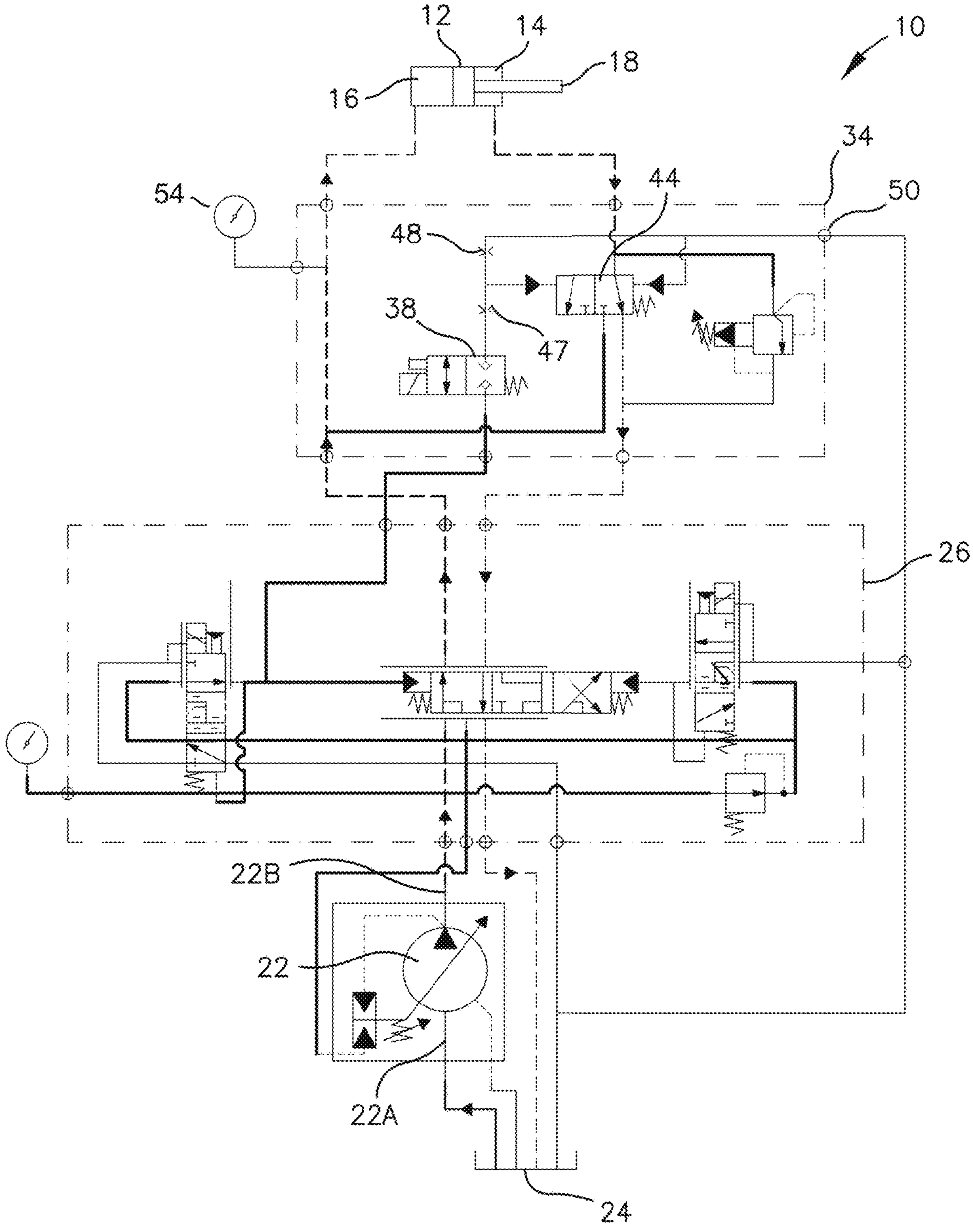
FIG. 4 illustrates a schematic of an embodiment of a hydraulic system with the piloted two-position three-way valve in position one.
Figure 5:
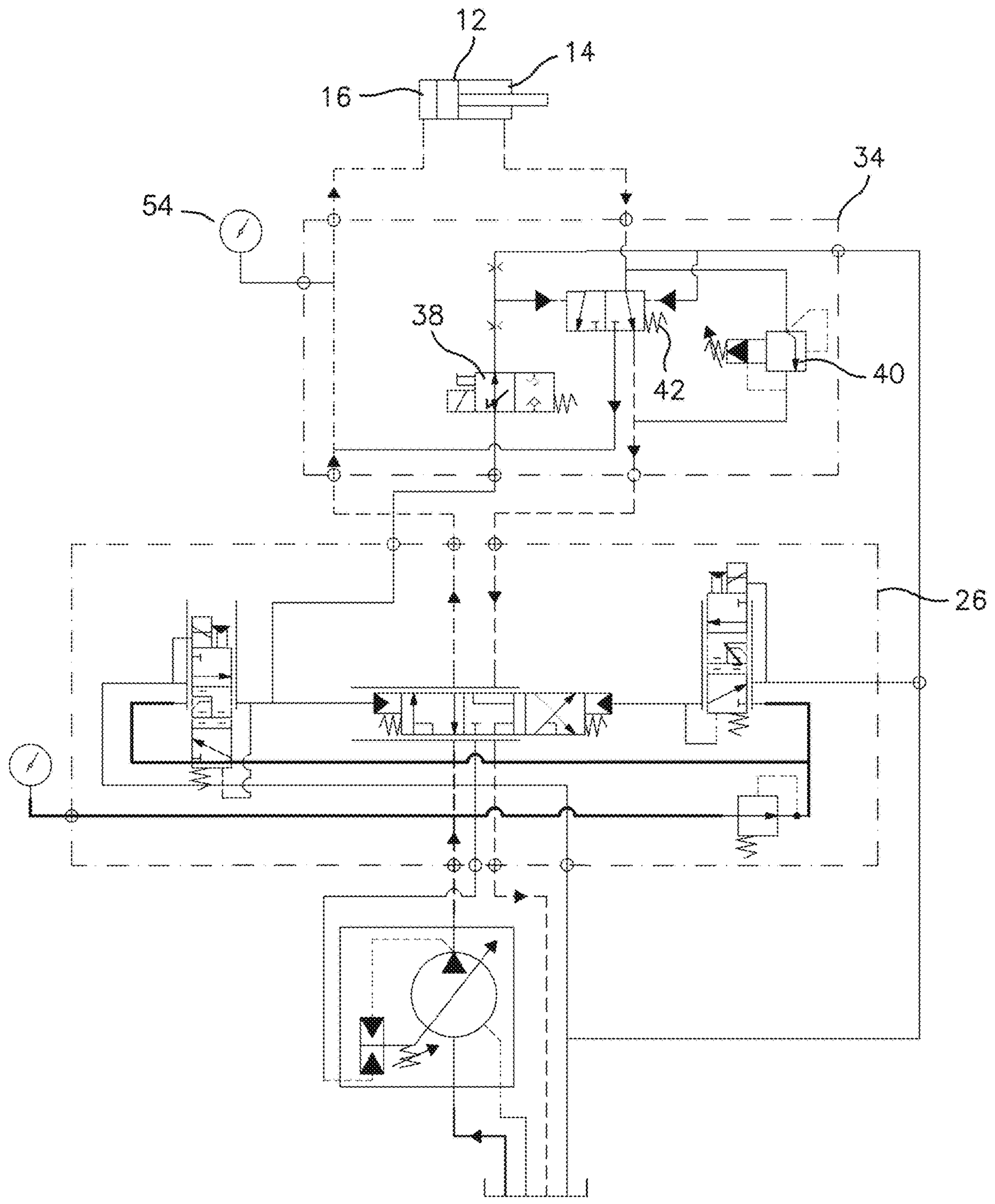
FIG. 5 illustrates a schematic of an embodiment of a hydraulic system with the piloted two-position three-way valve transitioning from position one to position two.
Figure 6:
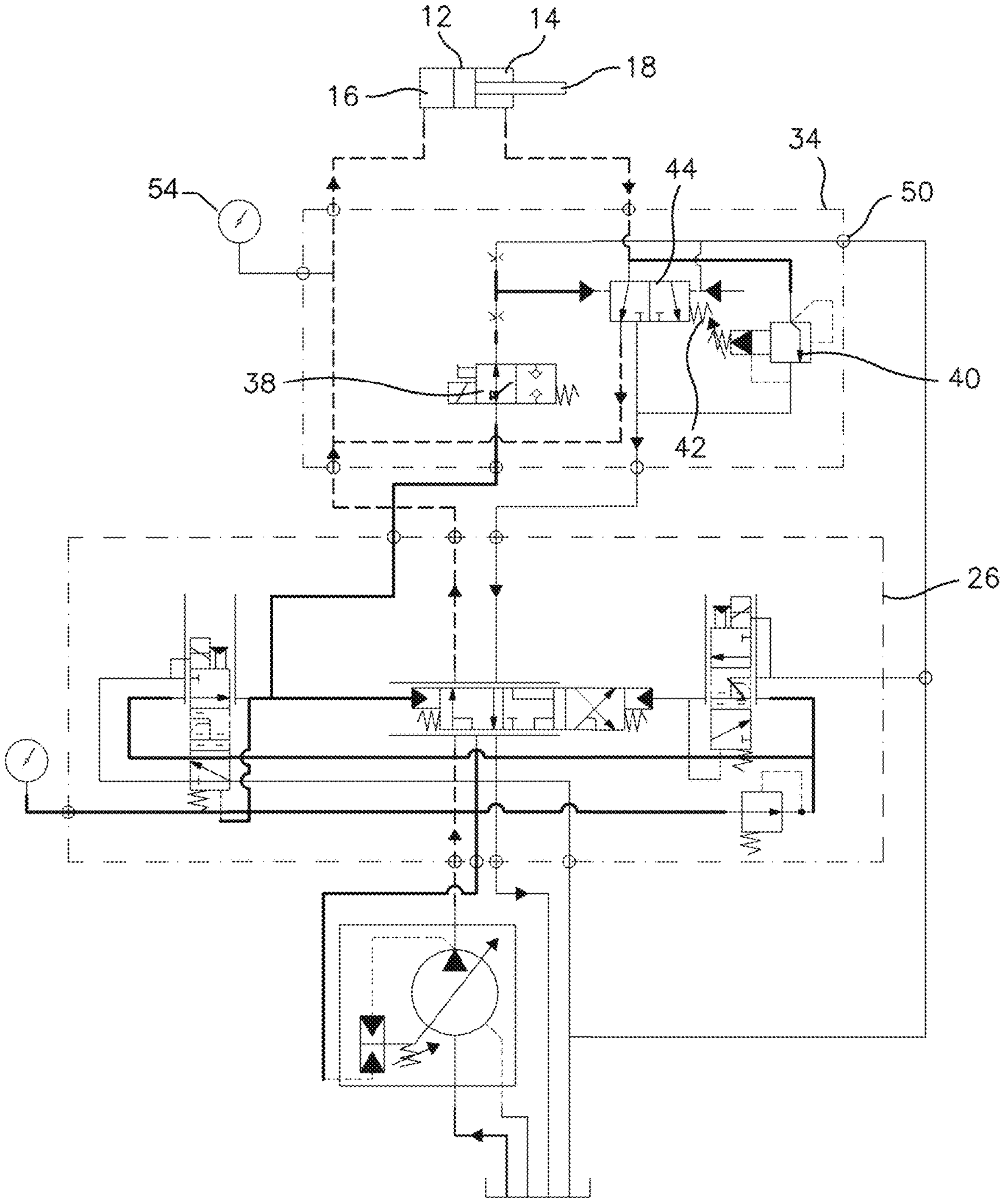
FIG. 6 illustrates a schematic of an embodiment of a hydraulic system with the piloted two-position three-way valve fully shifted to position two.

FIG. 4 illustrates, in a schematic format, the recycling of fluid from the retraction side 14 of a double acting hydraulic cylinder for use on the extension side 16 of the cylinder to accelerate piston 18 movement. The schematic of FIG. 4 reveals the direction of fluid flow within the entire system 10 when the regeneration valve assembly 34 is in the off position and the two-position three-way valve 44 is in position one. The darkened lines in FIGS. 4-6 illustrate fluid under pressure in the conduits of the hydraulic system. In position one, the two-position three-way valve 44 is not performing any function, and the fluid is transiting through the two-position three-way valve 44. When the two-position three-way valve 44 is in position one, the piston 18 is extending powerfully, but slowly.

FIG. 5 illustrates, in a schematic format, the direction of fluid flow and reveals that the normally closed solenoid valve 38 has been energized; however, the pilot pressure from the proportional pressure reducing valve 26 is insufficient to overcome the force of the spring 42 and shift the piloted two-position three-way valve 44 from position one to position two. FIG. 6 illustrates, in a schematic format, the direction of fluid flow. In FIG. 6 the pilot pressure is sufficient to shift the piloted two-position three-way valve 44 to position two and the oil exiting the retract side 14 of the cylinder 12 is forced to the extend side 16. The relief valve 40 in the pilot shifted regeneration valve assembly 34 does not allow the oil from the retract side 14 of the cylinder 12 to exceed the safe operating pressure of the system during the transition phase of the two-position three-way valve 44. Additional details of the system and method disclosed herein are further detailed below and at FIGS. 7A-7C.

Figure 7A:
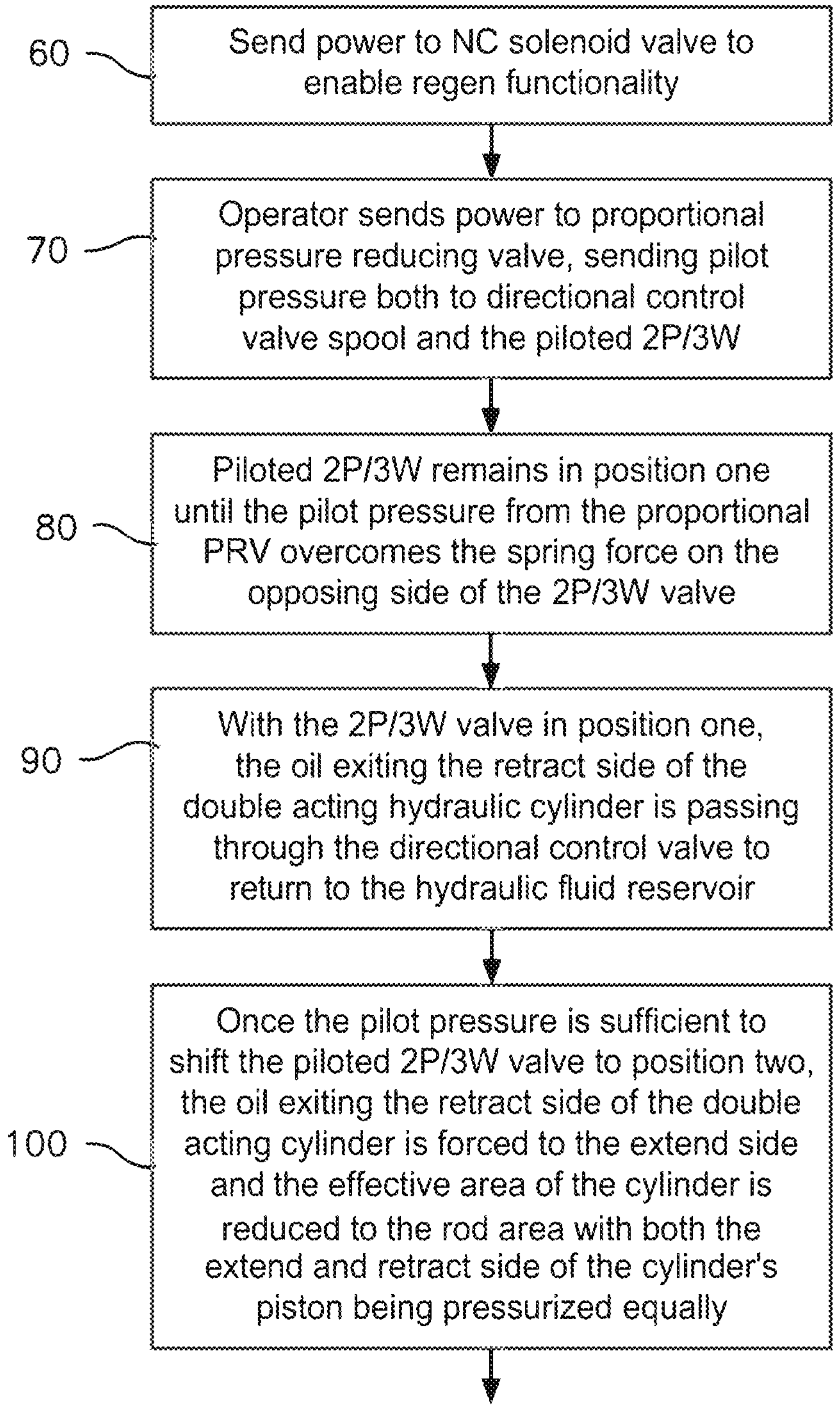
FIG. 7A illustrates a portion of the steps of a flow diagram for the operation of the disclosed regenerative hydraulic system.

As illustrated at FIG. 7A, the first step 60 of the disclosed method of activating the regeneration function provides for sending electrical power to a normally closed solenoid valve 38 (preferably activated with a switch means by the equipment operator). The normally closed solenoid valve 38 is preferably a two-position two-way solenoid valve. At step 70 in the disclosed method, the operator sends electrical power via manipulation of a joystick, or similar control means, to a proportional pressure reducing valve 26 sending pilot pressure to both the directional control valve spool 30 and the piloted two-position three-way valve 44.

As detailed at step 80, the piloted two position three-way valve 44 remains in position one until the pilot pressure from the proportional pressure reducing valve (PRV) 26 overcomes the force of the spring 42 on the opposing side of the two-position three-way valve 44. As detailed at step 90, with the two-position three-way valve 44 in position one, the fluid exiting the retract side 14 of the double acting hydraulic cylinder 12 is passing through the directional control valve 28 to return to the hydraulic fluid reservoir 24.

As discussed at step 100, once the pilot pressure is sufficient to shift the piloted two position three-way valve 44 to position two, the fluid exiting the retract side 14 of the hydraulic cylinder 12 is forced to an extend side 16 and the effective area of the hydraulic cylinder is reduced to the rod area 102, as seen at FIG. 1, with both the extend and retract sides 14, 16 of the cylinder 12 receiving fluid under the same pressure.

The effective area of a hydraulic cylinder refers to the area of the surface of the piston 18 that is exposed to hydraulic pressure, which is responsible for generating the force that moves the piston. This area determines the force exerted by the cylinder 12 for a given hydraulic pressure. The effective area depends on whether the hydraulic cylinder 12 is extending or retracting. For the extension stroke the effective area is the area of the piston face, which is the same as the cross-sectional area of the piston. For the retraction stroke, the effective area is the area of the piston minus the area of the rod 18, because the rod occupies some of the space on the piston side. Therefore, the area is reduced by the area of the rod 18.

Figure 7B:
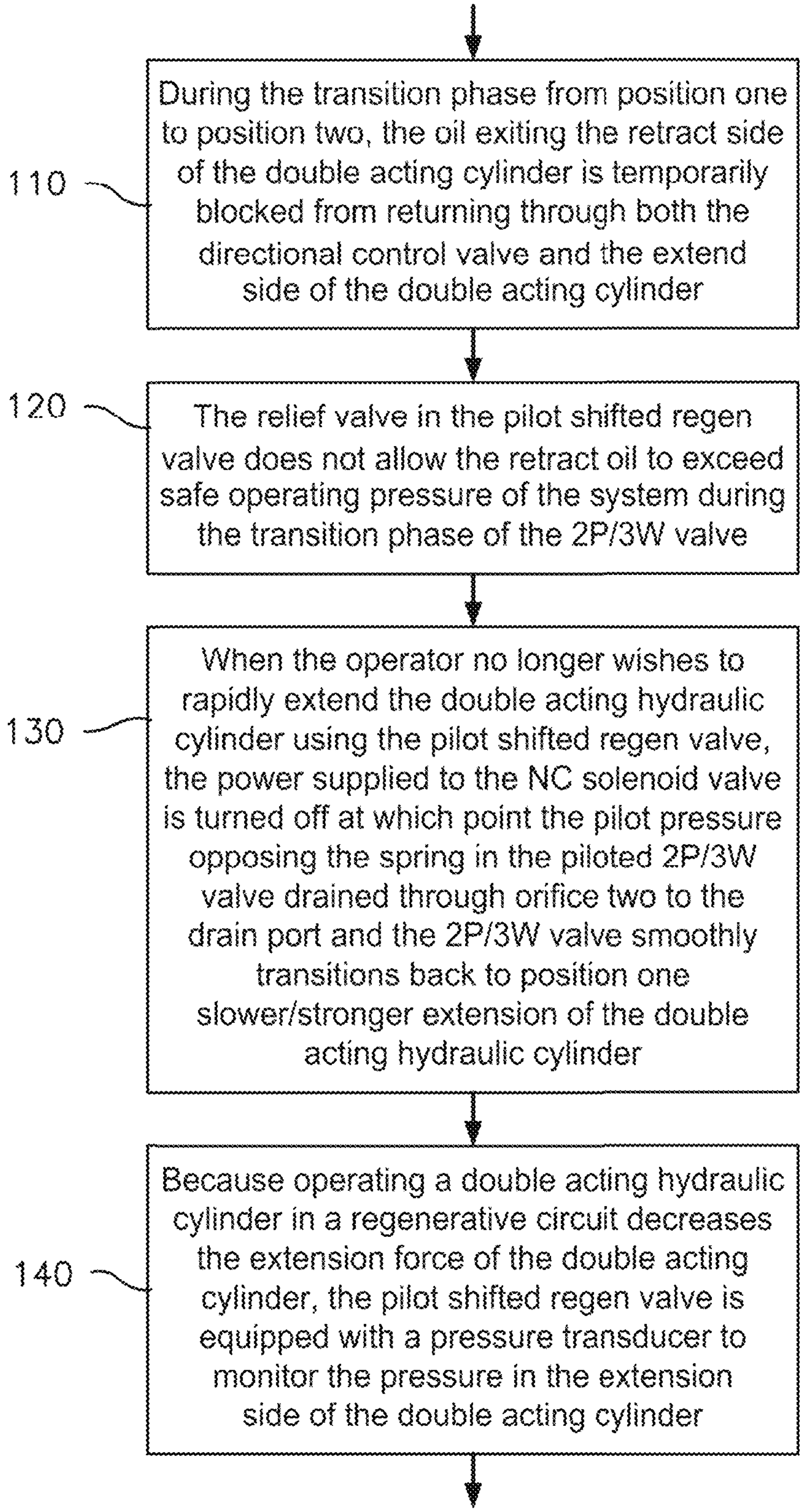
FIG. 7B illustrates a portion of the steps of a flow diagram for the operation of the disclosed regenerative hydraulic system.

Step 110, as illustrated in the flow diagram at FIG. 7B, requires that during the transition of the two-position three-way valve 44 from position one to position two, the fluid exiting the retract side of the hydraulic cylinder is temporarily blocked from returning through both the directional control valve 28 and the extend side 16 of the hydraulic cylinder 12. When the piloted two position three-way valve blocks the retract oil from the path there is a pressure spike. This can lead to damaging components like hoses, pumps, cylinders, or the valve 44 itself. Such spikes are typically caused by sudden changes in flow velocity or pressure that the system is not designed to handle.

Step 120 ensures that the operating pressure of the fluid on the retract side 14 of the cylinder 12 is maintained below a safe level by a relief valve 40 in the pilot shifted regeneration valve assembly 34. The relief valve 40 ensures that, during the transition phase of the two-position three-way valve 44, the pressure does not exceed the safe level. If the pressure rises too high, due to factors like an unexpected load or a malfunction, the relief valve 40 opens to relieve the excess pressure and protect the system from damage.

Step 130 requires that when the operator no longer wishes to rapidly extend the piston 18 using the pilot shifted regeneration valve assembly 34 the electrical power supplied to the normally closed solenoid valve 38 is turned off. At that time, the pilot pressure opposing the spring 42 in the piloted two-position three-way valve 44 is drained through an orifice 48 to a drain port 50 and the two-position three-way valve 44 smoothly transitions to position one resulting in a more forceful but slower extension of the piston 18. A well-designed valve 44 with an orifice 48 and a relief valve 40 ensures a smooth transition between position one and two.

Figure 7C:
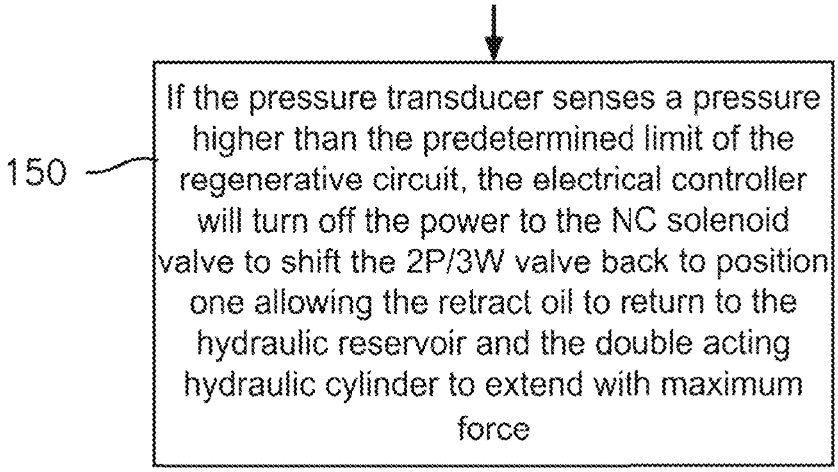
FIG. 7C illustrates a portion of the steps of a flow diagram for the operation of the disclosed regenerative hydraulic system.

Step 140 requires that because operating a double acting hydraulic cylinder 12 in a regenerative circuit decreases the force available for extension of the piston 18, the pilot shifted regeneration valve assembly 34 is equipped with a pressure transducer 54 to monitor the pressure in the extension side 16 of the hydraulic cylinder 12. At step 150, as illustrated at FIG. 7C, the pressure transducer 54 determines if a fluid pressure is higher than a predetermined limit of the regenerative circuit.

If the pressure transducer 54 senses a pressure exceeding the established limit, an electrical controller (not shown)

terminates electrical power to the normally closed solenoid valve 38 to shift the two-position three-way valve 44 back to position one. This transition from position two to position one on the two-position three-way valve 44 allows fluid from the retract side 14 of the cylinder 12 to return to the hydraulic reservoir 24 and the hydraulic cylinder 12 to extend with maximum force.

Having shown and described various embodiments of the disclosed system and method, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the disclosed system and method should be considered in terms of the following claims and is understood not to be limited to the details of structure and operation shown and described in the specification and drawings. Moreover, the order of the components detailed in the system and method may be modified without limiting the scope of the disclosure.

The disclosed system should not be construed as limiting in any way. Instead, the present disclosure is directed toward all novel and nonobvious features and aspects of the various disclosed embodiments, alone and in various combinations and sub-combinations with one another. The disclosed system is not limited to any specific aspect or feature or combination thereof, nor do the disclosed embodiments require that any one or more specific advantages be present, or problems be solved.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. We therefore claim as our invention all that comes within the scope of these claims.

The disclosure presented herein is believed to encompass at least one distinct invention with independent utility. While at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention has been described above with reference to one or more preferred embodiments, it will be appreciated that various changes or modifications may be made without departing from the scope of the invention as defined in the appended claims.

I claim:

1. A method for recycling fluid from a first side of a double acting hydraulic cylinder for use on a second side of the cylinder to accelerate piston movement, the method comprising:

sending power to a normally closed solenoid valve of a pilot-shifted regeneration valve assembly to enable a regeneration function;

sending power to a proportional pressure reducing valve thereby sending pilot pressure both to a spool of a directional control valve and a piloted two position three-way valve of the pilot-shifted regeneration valve assembly;

the piloted two position three-way valve remaining in position one until pilot pressure from the proportional pressure reducing valve overcomes a spring force of a spring on the opposing side of the piloted two-position three-way valve;

with the piloted two position three-way valve in position one, fluid exiting a retract side of the hydraulic cylinder passes through the directional control valve to return to a fluid reservoir;

once the pilot pressure is sufficient to shift the piloted two position three-way valve to position two, the fluid exiting the retract side of the hydraulic cylinder is forced to an extend side and an effective area of the hydraulic cylinder is reduced to a rod area with both the extend and retract side of the piston being pressurized equally;

during a transition phase from position one to position two, the fluid exiting the retract side of the hydraulic cylinder is temporarily blocked from returning through both the directional control valve and the extend side of the hydraulic cylinder;

operating pressure of the fluid on the retract side of the cylinder is limited to a safe level by a relief valve connected to a retract flow path;

when no longer requiring rapid extension of the piston using the pilot shifted regeneration valve assembly, the electrical power supplied to the normally closed solenoid valve is turned off by the operator causing the pilot pressure opposing the spring in the piloted two-position three-way valve to be drained through a second orifice to a drain port and the two-position three-way valve smoothly transitions to position one resulting in a more forceful but slower movement of the piston;

equipping the pilot shifted regeneration valve assembly with a pressure transducer to monitor the pressure in the extension side of the hydraulic cylinder;

sensing by the pressure transducer to assess whether fluid pressure is higher than a pre-established limit for the fluid in a regenerative circuit;

terminating electrical power to the normally closed solenoid valve to shift the two-position three-way valve to position one if the fluid pressure is higher than the predetermined limit of the pressure transducer; and allowing the fluid from the retract side of the cylinder to return to the hydraulic reservoir and to the extend side of the cylinder to extend the piston with maximum force.

2. The method of claim 1, wherein the first side of a double acting hydraulic cylinder is the retraction side, and the second side is the extension side of the cylinder.

3. The method of claim 1, wherein a first orifice regulates the pressure coming directly from the proportional pressure reducing pilot control valve and controls the amount of pressure entering the system.

4. The method of claim 3, wherein the second orifice disposed downstream from the first orifice, controls the flow of fluid that is drained from the pilot path of the two-position three-way valve.

5. The method of claim 4, wherein the fluid returned from the retract side of the cylinder combined with the pump flow is directed into the extension side of the cylinder, which extends the piston more quickly by utilizing both sources of hydraulic fluid.

6. A system for recycling fluid from a first side of a double acting hydraulic cylinder for use on a second side of the cylinder to accelerate piston movement; the system comprising:

a normally closed solenoid valve operable to enable a regeneration function;

a proportional pressure reducing valve operable to send pilot pressure to (i) a spool of a directional control valve and (ii) a piloted two-position three-way valve, wherein the piloted two position three-way valve remains in a position one until pilot pressure from the proportional pressure reducing valve overcomes a spring force of a spring on the opposing side of the piloted two position three-way valve, with the piloted two-position three-way valve in position one, fluid exiting a retract side of the hydraulic cylinder passes through the directional control valve to a fluid reservoir and once the pilot pressure is sufficient to shift the piloted two-position three-way valve to a position two, the fluid exiting the retract side of the hydraulic cylinder is forced to an extend side and an effective area of the hydraulic cylinder is reduced to a rod area with both the extend and retract side of the piston being pressurized equally, wherein during a transition phase from position one to position two, the fluid exiting the retract side of the hydraulic cylinder is temporarily blocked from returning through both the directional control valve and the extend side of the hydraulic cylinder;

a relief valve in the pilot shifted regeneration valve assembly for maintaining an operating pressure of the fluid on the retract side of the cylinder at a safe level, the relief valve being fluidly connected to a retract flow path, such that when the operator no longer seeks to rapidly extend the piston using the pilot-shifted regeneration valve assembly the power supplied to the normally closed solenoid valve is turned off at which point the pilot pressure opposing the spring in the piloted two-position three-way valve is drained;

a second orifice to drain the pilot pressure opposing the spring in the piloted two position three-way valve to a drain port, wherein the two-position three-way valve smoothly transitions to position one resulting in a more forceful but slower extension of the piston; and a pressure transducer to determine if the pressure in the extension side of the hydraulic cylinder is higher than a predetermined limit of a regenerative circuit, wherein the termination of electrical power to the normally closed solenoid valve to shift the two-position three-way valve to position one if the fluid pressure is higher than the predetermined limit of the system allowing the fluid from the retract side of the cylinder to return to the hydraulic reservoir and the hydraulic cylinder to extend with maximum force.

7. The system of claim 6, wherein a first orifice is operable to control the pressure at the regeneration valve and prevent pressure spikes or overshoot when the regeneration valve shifts.

8. The system of claim 7, wherein the first orifice decreases the pressure of hydraulic fluid entering the two-position-three-way valve.

9. The system of claim 8, wherein the efficiency of the first orifice to decrease pressure and facilitate flow of the fluid depends upon an orifice geometry and an edge sharpness of the first orifice.

10. The system of claim 9, wherein a discharge coefficient for the first orifice ranges from 0.6 to 0.9 including the upper and lower bounds.

11. The system of claim 10, wherein the geometry of the first orifice is at least one of sharp edged, conical, rounded, beveled, chamfered edges or comprises long or short tubes and a length to diameter ratio of less than one.

12. The system of claim 6, wherein a second orifice drains to a port the pilot pressure opposing the spring in the piloted two position three-way valve.

13. The system of claim 12, wherein the drain port allows the two-position three-way valve to smoothly transition to position one resulting in a more forceful but slower movement of the piston.

14. The system of claim 13, wherein the second orifice regulates the flow of pilot pressure fluid once the normally closed solenoid valve is closed.

15. The system of claim 14, wherein the second orifice regulates flow exiting the valve assembly and is used to control actuator speed and maintain a certain pressure on the actuator side to smooth transitions or hold a position.

16. The system of claim 15, wherein the discharge coefficient of the second orifice ranges from 0.6 to 0.9.

17. The system of claim 6, wherein the orifice geometry is at least one of sharp edged, conical, rounded, beveled, chamfered edges or comprise long or short tubes and a length to diameter ratio of greater than one.

* * * * *